US010579239B1

(12) United States Patent
Wilczynski et al.

(10) Patent No.: US 10,579,239 B1
(45) Date of Patent: Mar. 3, 2020

(54) SYSTEMS AND METHODS FOR PRODUCTION AND DISPLAY OF DYNAMICALLY LINKED SLIDE PRESENTATIONS

(71) Applicant: Palantir Technologies Inc., Palo Alto, CA (US)

(72) Inventors: Peter Wilczynski, San Francisco, CA (US); Andrew Elder, New York, NY (US); Quentin Spencer-Harper, London (GB); Roxana Nadrag, Seattle, WA (US); Timothy Slatcher, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/676,509

(22) Filed: Aug. 14, 2017

Related U.S. Application Data

(60) Provisional application No. 62/475,695, filed on Mar. 23, 2017.

(51) Int. Cl.
*G06F 16/438* (2019.01)
*G06F 3/0484* (2013.01)
(Continued)

(52) U.S. Cl.
CPC ...... *G06F 3/04845* (2013.01); *G06F 17/2235* (2013.01); *H04L 63/105* (2013.01);
(Continued)

(58) Field of Classification Search
CPC ............... G06F 3/0481; G06F 3/04842; G06F 17/30241; G06F 16/3323; G06F 16/4393; G06F 3/0484; G06F 3/04845; G06T 11/60
See application file for complete search history.

(56) References Cited

U.S. PATENT DOCUMENTS 4,899,161 A 2/1990 Morin et al.
4,958,305 A 9/1990 Piazza
(Continued)

FOREIGN PATENT DOCUMENTS

AU 2012216622 5/2015
DE 102013222023 1/2015
(Continued)

OTHER PUBLICATIONS

"A First Look: Predicting Market Demand for Food Retail using a Huff Analysis," TRF Policy Solutions, Jul. 2012, pp. 30.
(Continued)

Primary Examiner — Shen Shiau
(74) Attorney, Agent, or Firm — Sheppard Mullin Richter & Hampton LLP

(57) ABSTRACT

Systems and methods are provided for production and display of map based slide presentations. The system may provide a map of a geographic region via a map interface and select a portion of the geographic region for creation of a slide. The slide may be created to incorporate all of the data within the selected portion and may be part of a series of slides in a presentation. The user may further provide access controls to data aspects within the slide and the system may use the access controls to regulate display of the slide.

12 Claims, 7 Drawing Sheets

(51) Int. Cl.
  *G06F 17/22* (2006.01)
  *H04L 29/06* (2006.01)
  *G06F 3/14* (2006.01)
  *G06F 16/29* (2019.01)
  *G06F 16/332* (2019.01)
(52) U.S. Cl.
  CPC ........ *G06F 3/0484* (2013.01); *G06F 3/04842* (2013.01); *G06F 3/14* (2013.01); *G06F 16/29* (2019.01); *G06F 16/3323* (2019.01); *G06F 16/4393* (2019.01)

(56) References Cited

U.S. PATENT DOCUMENTS

| | | | |
|---|---|---|---|
| 5,329,108 | A | 7/1994 | Lamoure |
| 5,754,182 | A | 5/1998 | Kobayashi |
| 5,781,195 | A | 7/1998 | Marvin |
| 5,781,704 | A | 7/1998 | Rossmo |
| 6,091,956 | A | 7/2000 | Hollenberg |
| 6,157,747 | A | 12/2000 | Szeliski et al. |
| 6,169,552 | B1 | 1/2001 | Endo et al. |
| 6,173,067 | B1 | 1/2001 | Payton et al. |
| 6,178,432 | B1 | 1/2001 | Cook et al. |
| 6,247,019 | B1 | 6/2001 | Davies |
| 6,389,289 | B1 | 5/2002 | Voce et al. |
| 6,414,683 | B1 | 7/2002 | Gueziec |
| 6,483,509 | B1 | 11/2002 | Rabenhorst |
| 6,529,900 | B1 | 3/2003 | Patterson et al. |
| 6,631,496 | B1 | 10/2003 | Li et al. |
| 6,662,103 | B1 | 12/2003 | Skolnick et al. |
| 6,757,445 | B1 | 6/2004 | Knopp |
| 6,828,920 | B2 | 12/2004 | Owen et al. |
| 6,904,588 | B2 | 6/2005 | Reddy et al. |
| 6,983,203 | B1 | 1/2006 | Wako |
| 6,985,950 | B1 | 1/2006 | Hanson et al. |
| 7,036,085 | B2 | 4/2006 | Barros |
| 7,158,878 | B2 | 1/2007 | Rasmussen et al. |
| 7,375,732 | B2 | 5/2008 | Arcas |
| 7,379,811 | B2 | 5/2008 | Rasmussen et al. |
| 7,457,706 | B2 | 11/2008 | Malero et al. |
| 7,502,786 | B2 | 3/2009 | Liu et al. |
| 7,519,470 | B2 | 4/2009 | Brasche et al. |
| 7,529,195 | B2 | 5/2009 | Gorman |
| 7,539,666 | B2 | 5/2009 | Ashworth et al. |
| 7,558,677 | B2 | 7/2009 | Jones |
| 7,574,428 | B2 | 8/2009 | Leiserowitz et al. |
| 7,579,965 | B2 | 8/2009 | Bucholz |
| 7,617,314 | B1 | 11/2009 | Bansod et al. |
| 7,620,628 | B2 | 11/2009 | Kapur et al. |
| 7,663,621 | B1 | 2/2010 | Allen et al. |
| 7,791,616 | B2 | 9/2010 | Ioup et al. |
| 7,805,457 | B1 | 9/2010 | Viola et al. |
| 7,809,703 | B2 | 10/2010 | Balabhadrapatruni et al. |
| 7,836,028 | B1 | 11/2010 | Agarwal et al. |
| 7,872,647 | B2 | 1/2011 | Mayer et al. |
| 7,894,984 | B1 | 2/2011 | Rasmussen et al. |
| 7,899,611 | B2 | 3/2011 | Downs et al. |
| 7,920,963 | B2 | 4/2011 | Jouline et al. |
| 7,945,852 | B1 | 5/2011 | Pilskains |
| 7,962,281 | B2 | 6/2011 | Rasmussen et al. |
| 7,970,240 | B1 | 6/2011 | Chao et al. |
| 8,010,545 | B2 | 8/2011 | Stefik et al. |
| 8,036,632 | B1 | 10/2011 | Cona et al. |
| 8,065,080 | B2 | 11/2011 | Koch |
| 8,085,268 | B2 | 12/2011 | Carrino et al. |
| 8,108,790 | B2 | 1/2012 | Morrison, Jr. et al. |
| 8,134,457 | B2 | 3/2012 | Velipasalar et al. |
| 8,145,703 | B2 | 3/2012 | Frishert et al. |
| 8,200,676 | B2 | 6/2012 | Frank |
| 8,214,361 | B1 | 7/2012 | Sandler et al. |
| 8,214,764 | B2 | 7/2012 | Gemmell et al. |
| 8,229,947 | B2 | 7/2012 | Fujinaga |
| 8,230,333 | B2 | 7/2012 | Decherd et al. |
| 8,290,942 | B2 | 10/2012 | Jones et al. |
| 8,290,943 | B2 | 10/2012 | Carbone et al. |
| 8,301,464 | B1 | 10/2012 | Cave et al. |
| 8,325,178 | B1 | 12/2012 | Doyle, Jr. |
| 8,368,695 | B2 | 2/2013 | Howell et al. |
| 8,397,171 | B2 | 3/2013 | Klassen et al. |
| 8,400,448 | B1 | 3/2013 | Doyle, Jr. |
| 8,407,180 | B1 | 3/2013 | Ramesh et al. |
| 8,412,234 | B1 | 4/2013 | Gatmir-Motahari et al. |
| 8,412,707 | B1 | 4/2013 | Mianji |
| 8,422,825 | B1 | 4/2013 | Neophytou et al. |
| 8,452,790 | B1 | 5/2013 | Mianji |
| 8,463,036 | B1 | 6/2013 | Ramesh et al. |
| 8,489,331 | B2 | 7/2013 | Kopf et al. |
| 8,489,641 | B1 | 7/2013 | Seefeld et al. |
| 8,498,984 | B1 | 7/2013 | Hwang et al. |
| 8,508,533 | B2 | 8/2013 | Cervelli et al. |
| 8,514,229 | B2 | 8/2013 | Cervelli et al. |
| 8,515,207 | B2 | 8/2013 | Chau |
| 8,564,596 | B2 | 10/2013 | Carrino et al. |
| 8,742,934 | B1 | 6/2014 | Sarpy et al. |
| 8,781,169 | B2 | 7/2014 | Jackson et al. |
| 8,799,799 | B1 | 8/2014 | Cervelli et al. |
| 8,830,322 | B2 | 9/2014 | Nerayoff et al. |
| 8,938,686 | B1 | 1/2015 | Erenrich et al. |
| 8,949,164 | B1 | 2/2015 | Mohler |
| 8,983,494 | B1 | 3/2015 | Onnen et al. |
| 9,009,177 | B2 | 4/2015 | Zheng et al. |
| 9,021,384 | B1 | 4/2015 | Beard et al. |
| 9,104,293 | B1 | 8/2015 | Kornfeld et al. |
| 9,104,695 | B1 | 8/2015 | Cervelli et al. |
| 9,111,380 | B2 | 8/2015 | Piemonte et al. |
| 9,129,219 | B1 | 9/2015 | Robertson et al. |
| 9,146,125 | B2 | 9/2015 | Vulcano et al. |
| 9,280,618 | B1 | 3/2016 | Bruce et al. |
| 9,600,146 | B2 * | 3/2017 | Cervelli ............... G06F 3/0482 |
| 9,996,229 | B2 * | 6/2018 | Erenrich ............... G06F 3/0484 |
| 10,387,002 | B2 * | 8/2019 | Spirer ................. G06F 3/0484 |
| 2002/0003539 | A1 | 1/2002 | Abe |
| 2002/0033848 | A1 | 3/2002 | Sciammarella et al. |
| 2002/0039108 | A1 * | 4/2002 | Roy ................. G06F 17/30241 345/619 |
| 2002/0116120 | A1 | 8/2002 | Ruiz et al. |
| 2002/0130867 | A1 | 9/2002 | Yang et al. |
| 2002/0130906 | A1 | 9/2002 | Miyaki |
| 2003/0052896 | A1 | 3/2003 | Higgins et al. |
| 2003/0103049 | A1 | 6/2003 | Kindratenko et al. |
| 2003/0144868 | A1 | 7/2003 | MacIntyre et al. |
| 2003/0163352 | A1 | 8/2003 | Surpin et al. |
| 2003/0225755 | A1 | 12/2003 | Iwayama et al. |
| 2004/0030492 | A1 | 2/2004 | Fox et al. |
| 2004/0039498 | A1 | 2/2004 | Ollis et al. |
| 2004/0098236 | A1 | 5/2004 | Mayer et al. |
| 2005/0031197 | A1 | 2/2005 | Knopp |
| 2005/0034062 | A1 | 2/2005 | Bufkin et al. |
| 2005/0080769 | A1 | 4/2005 | Gemmell |
| 2005/0143602 | A1 | 6/2005 | Yada et al. |
| 2005/0162523 | A1 | 7/2005 | Darrell et al. |
| 2005/0182502 | A1 | 8/2005 | Iyengar |
| 2005/0182793 | A1 | 8/2005 | Keenan et al. |
| 2005/0223044 | A1 | 10/2005 | Ashworth et al. |
| 2005/0267652 | A1 | 12/2005 | Allstadt et al. |
| 2006/0005163 | A1 | 1/2006 | Huesken et al. |
| 2006/0015499 | A1 * | 1/2006 | Clissold ............... G06F 16/10 |
| 2006/0026170 | A1 | 2/2006 | Kreitler et al. |
| 2006/0139375 | A1 | 6/2006 | Rasmussen et al. |
| 2006/0146050 | A1 | 7/2006 | Yamauchi |
| 2006/0149596 | A1 | 7/2006 | Surpin et al. |
| 2006/0200384 | A1 | 9/2006 | Arutunian et al. |
| 2006/0251307 | A1 | 11/2006 | Florin et al. |
| 2006/0259527 | A1 | 11/2006 | Devarakonda et al. |
| 2006/0271277 | A1 | 11/2006 | Hu et al. |
| 2006/0279630 | A1 | 12/2006 | Aggarwal et al. |
| 2007/0011150 | A1 | 1/2007 | Frank |
| 2007/0016363 | A1 | 1/2007 | Huang et al. |
| 2007/0024620 | A1 | 2/2007 | Muller-Fischer et al. |
| 2007/0057966 | A1 | 3/2007 | Ohno et al. |
| 2007/0078832 | A1 | 4/2007 | Ott et al. |
| 2007/0115373 | A1 | 5/2007 | Gallagher et al. |
| 2007/0124373 | A1 | 5/2007 | Chatterjee et al. |
| 2007/0188516 | A1 | 8/2007 | Loup et al. |

(56) References Cited

U.S. PATENT DOCUMENTS

| | | |
|---|---|---|
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0189678 A1 | 8/2008 | Joo et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0019426 A1 | 1/2009 | Baueumer et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0217784 A1* | 8/2010 | Carter .................. G06F 16/367 707/805 |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2011/0270705 A1 | 11/2011 | Parker |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132389 A1* | 5/2013 | Majidian ............... G06F 16/319 707/736 |
| 2013/0132398 A1 | 5/2013 | Pfiefle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339893 A1 | 12/2013 | Blumenberg et al. |
| 2014/0176606 A1 | 6/2014 | Narayan et al. |
| 2014/0210839 A1* | 7/2014 | Castelli ................ G06Q 10/063 345/581 |
| 2014/0218400 A1 | 8/2014 | O'Toole et al. |
| 2014/0282013 A1* | 9/2014 | Amijee ............... G06F 16/4393 715/732 |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0029176 A1 | 1/2015 | Baxter et al. |
| 2015/0100907 A1 | 4/2015 | Erenrich et al. |
| 2015/0106170 A1 | 4/2015 | Bonica |
| 2015/0177964 A1* | 6/2015 | Spirer ................. G06F 16/4393 715/732 |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0281250 A1* | 10/2015 | Miller ................. G06F 16/4393 726/1 |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2017/0052654 A1* | 2/2017 | Cervelli ................. G06F 3/0482 |
| 2017/0052655 A1* | 2/2017 | Cervelli ................. G06F 3/0482 |
| 2017/0206684 A1 | 7/2017 | Duncker |
| 2017/0220232 A1* | 8/2017 | Gilmore ................ G06F 3/0488 |
| 2019/0179916 A1* | 6/2019 | Sivaji .................... G06Q 10/10 |

FOREIGN PATENT DOCUMENTS

| | | |
|---|---|---|
| EP | 0 763 201 | 3/1997 |
| EP | 2 575 107 | 4/2013 |
| EP | 2858014 | 4/2015 |
| EP | 2963595 | 1/2016 |
| GB | 2516155 | 1/2015 |
| NL | 2012778 | 11/2014 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2004/057268 | 7/2004 |
| WO | WO 2005/013200 | 2/2005 |
| WO | WO 2008/064207 | 5/2008 |
| WO | WO 2009/061501 | 5/2009 |
| WO | WO 2009/123975 | 10/2009 |
| WO | WO 2011/058507 | 5/2011 |

OTHER PUBLICATIONS

"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.

"HunchLab: Heat Map and Kernel Density Calculation for Crime Analysis," Azavea Journal, printed from www.azavea.com/blogs/

(56) References Cited

OTHER PUBLICATIONS newsletter/v4i4/kernel-density-capabilities-added-to-hunchlab/ on Sep. 9, 2014, 2 pages.
Barnes et al., "Viewshed Analysis", GIS-ARC/INFO 2001, <www.evsc.virginia.edu/~jhp7e/evsc466/student_pres/Rounds.pdf>.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chen et al., "iVIBRATE: Interactive Visualization-Based Framework for Clustering Large Datasets," ACM Transaction on Information Systems, vol. 24, No. 2, Apr. 2006, pp. 245-294.
Correa et al., " SPVN: A New Application Framework for Interactive Visualization of Large Datasets," SIGGRAPH 2007, San Diego, California, Aug. 5-9, 2007, No. 12, 6 pages.
Definition "Identify", downloaded Jan. 22, 2015, 1 page.
Definition "Overlay", downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Eick, Stephen G., "Visual Discovery and Analysis," IEEE Transactions on Visualization and Computer Graphics, vol. 6, No. 1, Jan.-Mar. 2000, pp. 44-58.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Gorr et al., "Crime Hot Spot Forecasting: Modeling and Comparative Evaluation", Grant 98-IJ-CX-K005, May 6, 2002, 37 pages.
Griffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Huang et al., "Systematic and Integrative Analysis of Large Gene Lists Using David Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Ipbucker, C., "Inverse Transformation for Several Pseudo-cylindrical Map Projections Using Jacobian Matrix," ICCSA 2009, Part 1 LNCS 5592, pp. 553-564.
Jomier et al., "Remote Visualization of Large Datesets with MIDAS and ParaViewWeb," Web3D '11, Paris, France, Jun. 20-22, 2011, pp. 147-150.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," <http://www-users.cs.umn.edu/~npramod/enc_pdf.pdf> retrieved Jan. 28, 2010, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary:Unconnected ways and other data quality issues," http://www.openstreetmap.org/user/amm/diary printed Jul. 23, 2012 in 3 pages.
Poi Editor, "How to: Create Your Own Points of Interest," <http://www.poieditor.com/articles/how_to__create_your_own_points_of_interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
Reibel et al., "Areal Interpolation of Population Counts Using Pre-classi_ed Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.oreweb/20061001053327/http://sonris-www.dnr.state.la.us/gis/instruct_files/tutslide12> printed Jan. 3, 2013 in 1 page.
Tangelder et al., "Freeform Shape Matching Using Minkowski Operations," The Netherlands, Jun. 1996, pp. 12.
Thompson, Mick, "Getting Started with GEO," Getting Started with GEO, Jul. 26, 2011.
Valentini et al., "Ensembles of Learning Machines", M. Marinaro and R. Tagliaferri (Eds.): WIRN VIETRI 2002, LNCS 2486, pp. 3-20.
VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.
Vivid Solutions, "JTS Topology Suite: Technical Specifications," <http://www.vividsolutions.com/jts/bin/JTS%20Technical%20Specs.pdf> Version 1.4, 2003, pp. 36.
Wikipedia, "Douglas_Peucker-Algorithms," <http://de.wikipedia.org/w/index.php?title=Douglas-Peucker-Algorithmus&oldid=91846042> printed Jul. 2011, pp. 2.
Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.
Wongsuphasawat et al., "Visual Analytics for Transportation Incident Data Sets," Transportation Research Record 2138, 2009, pp. 135-145.
Woodbridge, Stephen, "[geos-devel] Polygon simplification," <http://lists.osgeo.org/pipermail/geos-devel/2011-May/005210.html> dated May 8, 2011, pp. 3.

* cited by examiner

SYSTEMS AND METHODS FOR PRODUCTION AND DISPLAY OF DYNAMICALLY LINKED SLIDE PRESENTATIONS

CROSS REFERENCE TO RELATED APPLICATIONS

This application claims the benefit under 35 U.S.C. § 119(e) of the U.S. Provisional Application Ser. No. 62/475,695, filed Mar. 23, 2017, the content of which is hereby incorporated by reference in its entirety.

FIELD OF THE INVENTION

This disclosure relates to approaches for production and display of map based slide presentations.

BACKGROUND

Under conventional approaches, software for developing and displaying slide presentations may be provided. Conventional approaches for creating slide presentations generally permit users to insert images and text in slides, and to display the slides in a linear fashion. Such conventional approaches, however, may be limited in the types of information that can be inserted and presented through slides. These and other drawbacks exist with conventional slide presentation software.

SUMMARY

A claimed solution rooted in computer technology overcomes problems specifically arising in the realm of computer technology. In various implementations, a computing system is configured to provide tools that allow users to create map-based slide presentations. For example, in some embodiments, the computing system can provide a map interface through which users can select map data to be included in one or more slides of a presentation. Such map data may include images corresponding to selected map regions as well as selected map labels that describe points of interest in the map regions. The map interface can also permit users to modify various attributes of the map regions (e.g., zoom level, map labels, etc.). Once a desired map region is ready for publication, the user can select an option to export map data corresponding to the map region into one or more slides of the presentation. In some embodiments, information in slides can be linked to data objects. In these embodiments, such information can be updated in response to modifications to the linked data objects. In some embodiments, the technology may also permit the creation of hierarchical slide displays, wherein a portion of a slide display may include a link to another slide display in a nested hierarchy.

In various implementations, the technology may provide a variety of features that permit users to generate slides and slide presentations from map data. For example, a map interface may be provided to a user, permitting the user to select a map portion from which to generate one or more slides. The user may manipulate the map via the interface to define the map portion to be included on the slide, by, for example, altering zoom levels, adjusting labels, selecting map layers, including or excluding points of interest, and/or other manipulations. The selected map portion may be exported to create a slide data object. In some implementations, the slide data object is linked to the source map. In some implementations, the source map being accessed through the interface may include geographical data objects or links to geographical data objects. Such geographical data objects may contain information or data about corresponding locations on the map. When a slide is being generated from a map portion, some or all of the geographical data objects included in a region captured by the slide may be linked to and/or incorporated within the slide. In some implementations, a user may select which geographical data objects to include in the newly created slide. In some implementations, when a slide is created from a source map, the slide itself may be a geographical data object of the map, thereby permitting a user or analyst to view the slide when viewing the source map and/or to incorporate the slide into another slide generated from the source map. In some implementations, a user may tag slides and the information they contain with access control tags. Access control tags may serve to automatically determine which aspects of a slide to make visible during a presentation, based on the access control levels of those viewing the presentation. In some implementations, the map data on the slides may be manipulated during a presentation.

In some implementations, a system for generating a dynamically linked geographical slide presentation is provided. The system may include one or more processors and a memory storing instructions. When executed by the one or more processors the system may be caused to provide map data corresponding to a given geographic region for presentation through an interface, determine a selection of a portion of the geographic region through the interface, and generate a first slide of a slide presentation based at least in part on the selection, the first slide including at least a visual representation of the selected portion of the geographic region.

In some implementations, a method for generating a dynamically linked geographical slide presentation is provided. The method may be performed on a computer system having one or more physical processors programmed with computer program instructions that, when executed by the one or more physical processors, cause the computer system to perform the method. The method may include providing, by the computer system, map data corresponding to a given geographic region for presentation through an interface, determining, by the computer system, a selection of a portion of the geographic region through the interface, and generating, by the computer system, a first slide of a slide presentation based at least in part on the selection, the first slide including at least a visual representation of the selected portion of the geographic region.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

The technology described herein relates to systems and methods for producing dynamically linked slide displays from map data. The system provides tools to facilitate the generation of map-based slides from map data. The map data may correspond to a geographic region and may include one or more geographic data objects corresponding to various aspects of the map and/or locations in the map. Implementations of the system permit a user to select a portion of a geographic region, using a map interface, for inclusion within a slide. The mapping interface may further permit a user to include with the slide any portion of the map data, e.g., geographic data objects, associated with the selected portion. In some implementations, all aspects of the slide (e.g., geographic data objects) may be dynamically linked to the source map data from which they were extracted. This linked slide data (e.g., geographical data objects) can be updated when the source map data is updated. In some implementations, generated slides may themselves become geographic data objects and may be included in other generated slides. Thus, in some implementations, generated slides may be linked to other slides in a hierarchical fashion. In some implementations, access controls may be applied to any or all data included within a slide, thereby permitting the restriction of data within the slide to viewers having an appropriate access level.

Figure 1:
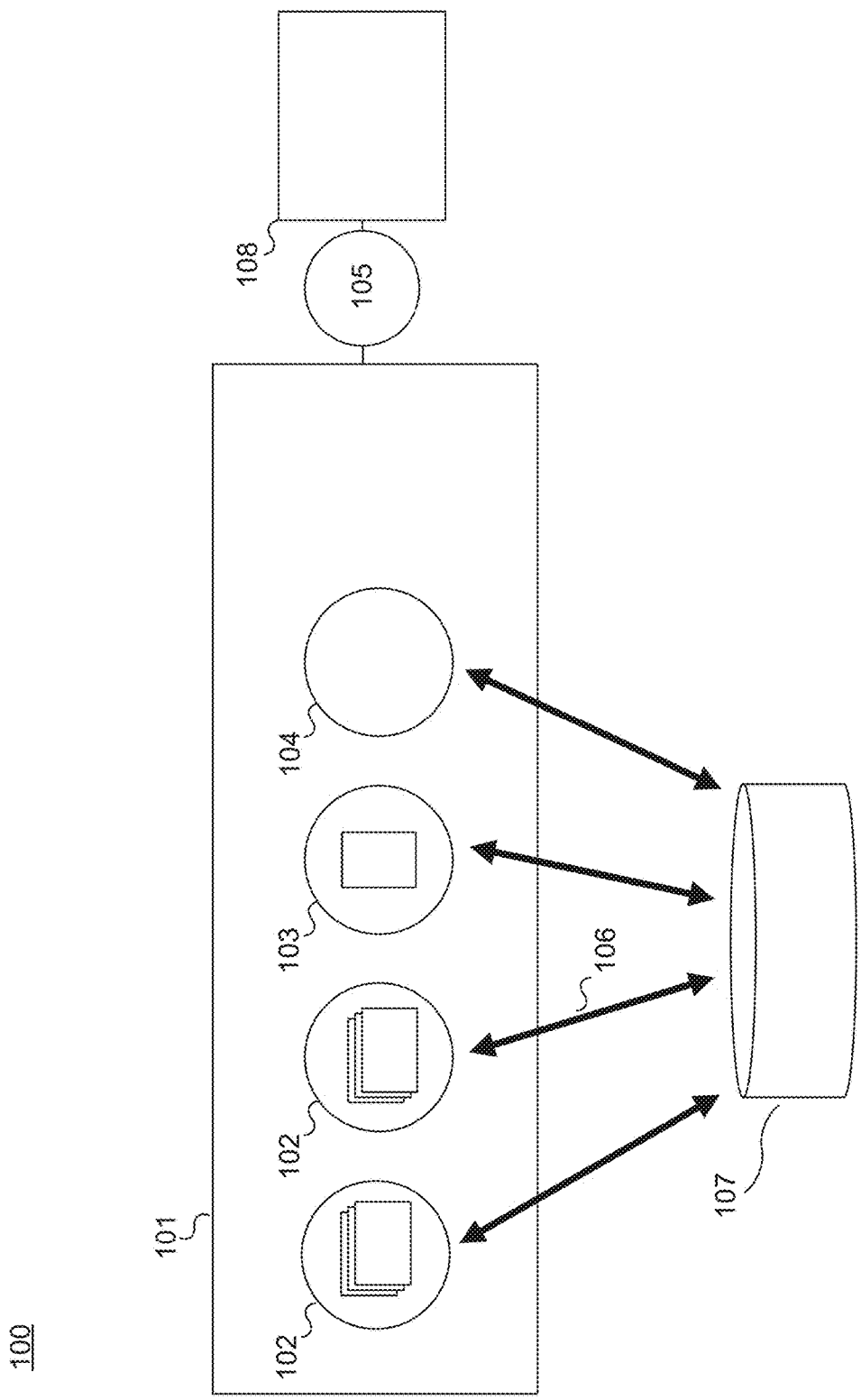
FIG. 1 illustrates an example diagram of an object based data structure, according to some implementations.

FIG. 1 illustrates an example object based data structure 100 that may underlie various data structures described herein. In this example, the object based data structure 100 is centered around data object 101 and data object 108. Each data object 101, 108 may include several components, including one or more object properties 102, one or more data notes 103, one or more media components 104, and one or more data links 105. The origin of data stored in data object 101, 108 may be identified by a data source record 106 that references a data source 107 of the stored data.

In some implementations, the object based data structure 100 uses an object model, e.g., a framework for how data is stored. The object model can be further defined by an ontology, defining the types of data and how they are stored in a given system. The ontology can be updated to match the needs of the system and analysts. The ontology may define various types of data objects 101 and 108, object properties 102, and data links 105, to name some examples. The ontology may further define which data object types may be associated with each other. Each data object type may have a corresponding Uniform Resource Identifier (URI) that identifies the data object type.

In some implementations, object types define the kinds of things that may be represented in the system and provide structure for data objects 101. Object types may be derived from, for example, geographical information, slide information, entity types, event types, document types, and multimedia types. Event and document types may have temporal and geospatial data directly included within the data object (e.g., the data object 101) itself. An object type may define the number and composition of properties 102, notes 103, and media components 104 of a data object 101, for example. The object type may further define what other types of objects that data links 105 may permit association with. For example, an entity object type may define a data object 101 used to store data about a person and may include respective data properties 102 for storing a name, address, occupation, e-mail address, phone number, etc. Data links 105 of an entity object 101 may permit the entity object 101 to be linked to other entity objects (e.g., contacts or associates), event objects (e.g., events attended or invited to), linked to document objects (e.g., authored), or other types of objects.

In some implementations, object property types may define the type and behavior of input data. For example, property types may define the structure of the data stored in an object property 102. The property type may define one or more data fields, the type of data associated with the field, as well as tools that may operate on the data fields. Property types may be simple, including a single data field, and/or may be composite, including multiple data fields. For example, an e-mail property type may define an e-mail object property. For example, the e-mail address john@example.com may be stored in an e-mail object property as follows: URI: com.property.Email, Base Type: Composite, with these components: EMAIL_USERNAME with the value "john," EMAIL_DOMAIN with the value "example.com." Further, the e-mail property type may define tools for parsing and concatenating the username and the domain, depending on what is required.

In some implementations, data link types may define the types of data links 105 that can exist between data objects (e.g., data object 101 and data object 108). Links may be symmetric or asymmetric. In some implementations, links may have one object that is considered the "parent" object and the other that is the "child" Object. In the case of symmetric links, e.g., "Spouse Of," which the parent and child objects are not contextually important. In the case of asymmetric links, like "Manager Of/Managed By," the parent and child may reflects the direction of the link.

Thus, in various implementations, an ontology of an object-based data system may define the way in which data is organized in the object based data system. The ontology can define the types of objects that may be stored and the components of the defined data objects (e.g., data object 101, data object 108, etc.) as well as the manner in which the defined data objects may link to one another through data links 105.

Figure 2:
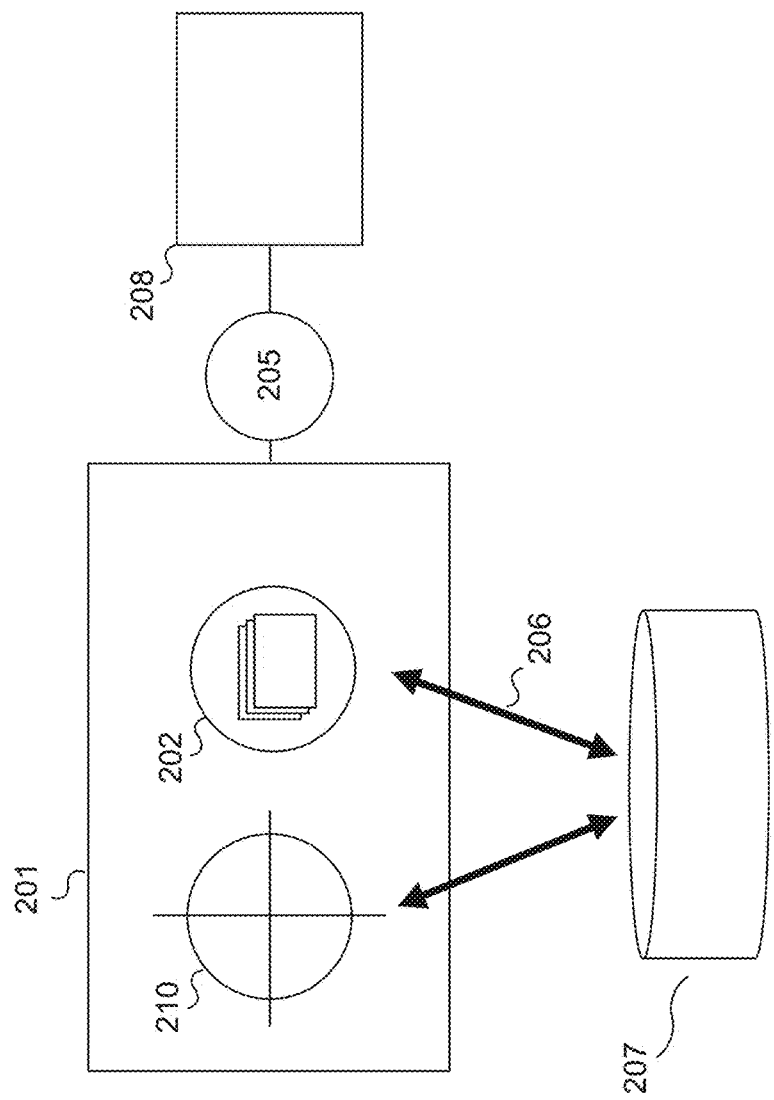
FIG. 2 illustrates an example diagram of a geographical data object structure, according to some implementations.
Figure 3:
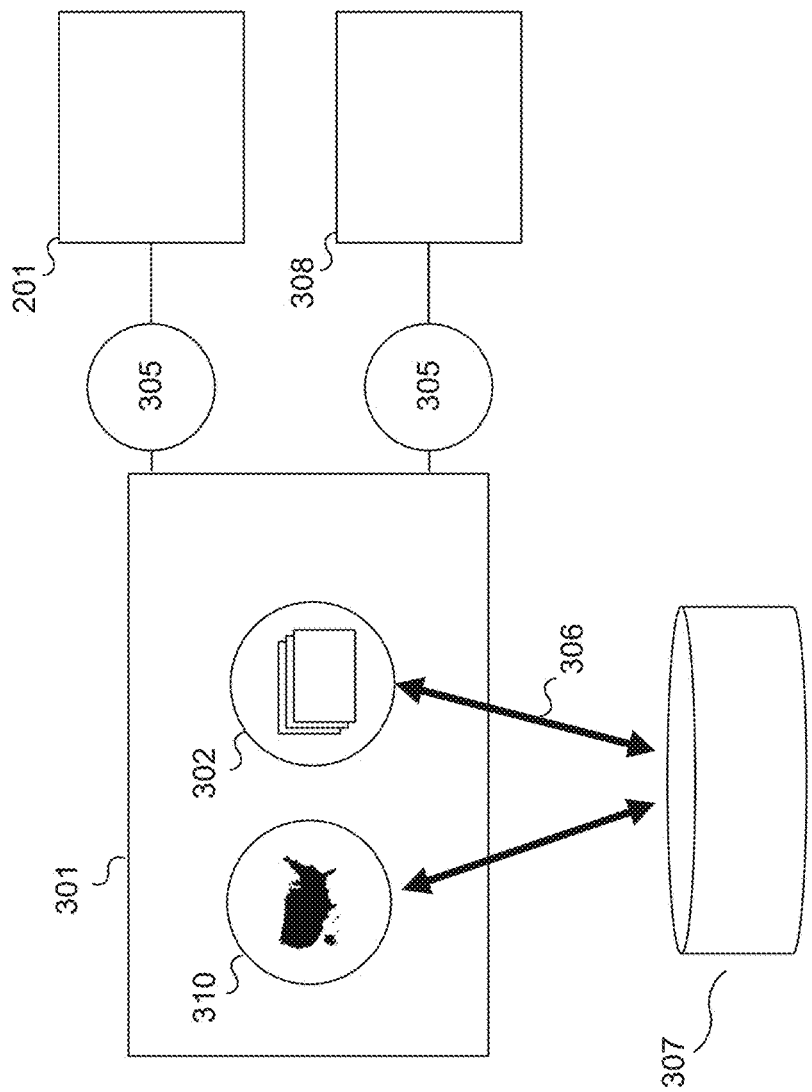
FIG. 3 illustrates an example diagram of a slide data object structure, according to some implementations.

FIGS. 2 and 3 illustrate object based data structures corresponding to a geographic ontology and a slide presentation ontology, respectively. The geographic ontology illustrated in FIG. 2 and the slide presentation ontology illustrated in FIG. 3 may be used in various implementations of the system described herein.

FIG. 2 illustrates an example geographic object based data structure 200. In this example, the geographic object based data structure 200 is centered around geographic data objects 201 and 208. Each geographic data object 201, 208 may include several components, including at least a geographic location property 210, one or more geographic object properties 202, and one or more geographic data object links 205. The origin of data stored in geographic data object 201 may be identified by a geographic data source record 206 that references a geographic data source 207 of the stored data.

In some implementations, the geographic object based data structure 200 uses a geographic object model defined by a geographic ontology for storing data. For example, a geographic ontology may define a geographic data object 201 which may include a geographic location property 210, a geographic object property 202, and at least one geographic data link 205. The geographic data object 201 can be a specialized data object having any or all of the properties of data object 101 including the additional aspects described. In some implementations, the geographic location property 210 may include information describing a geographic location with which the geographic data 201 is associated. For example, geographic location property 210 may include GPS coordinates, a street address, a three word geographic address, and/or any other geographic coding scheme that may represent a location with which the geographic data object 201 is associated. Geographic object property 202 may be an object property type that includes data describing a given geographic location. For example, a geographic object property 202 may include information about populations, weather conditions, soil conditions, climate history, and/or other types of data associated with the geographic locations. In some implementations, geographic object property 202 may include information about points of interest such as an institution, building, or other entity located at the geographic location (e.g., a school, bus stop, company, etc.). In some implementations, the geographic data link 205 may include a link to any type of data object, including, for example, the data object 101, the geographic data objects 201 and 208, and slide objects (discussed below). In some implementations, the geographic data links 205 may share the properties of data links 105 as described above. Thus, the geographic data structure 200 defines a data ontology for a geographic data object 201, which may be a data object that corresponds to a map, geographic location, or any other data associated with the geographic location.

FIG. 3 illustrates an example slide object based data structure 300. In this example, the slide object based data structure 300 is centered around slide data objects 301 and 308. Each slide data object 301 may include several components, including at least a map data property 310, one or more slide object properties 302, and one or more slide data object links 305. The origin of data stored in slide data object 301 may be identified by a slide data source record 306 that references a slide data source 307 of the stored data. Each slide data object (e.g., slide data objects 301 and 308) includes the requisite information to reproduce a presentation slide. For example, a slide data object may contain text data, image data, audiovisual media data, map data, and/or references and links to other slides, to name some examples.

The slide object based data structure 300 can a slide object model as defined by a slide presentation ontology for storing data. In some implementations, a slide presentation ontology may define a slide data object 301 which may include a map data property 310, a slide object property 302, and at least one slide data link 305. Slide data object 301 may be a specialized data object having any or all of the properties of data object 101 including the additional aspects described. In some implementations, the map data property 310 may include information describing a portion of a geographic region for which the slide contains information. In some implementations, the map data property 310 may be defined by raw map information (e.g., as stored in slide data source 307) and/or by map information stored in an alternate data source. For example, when the slide object 301 is created, the slide object 301 may include data that is obtained directly from the geographic map data from the slide object 301 was created. In another example, the slide object 301 may also include links and/or references to the geographic map data from which the slide object 301 was created. In some implementations, the slide object property 302 may be an object property type that includes data describing a presentation slide. For example, a slide object property 302 may include information describing map data that is included in a map data property 310. In some implementations, the slide object property 302 may include any or all of the aspects described above for object property 202. In some implementations, a slide data link 305 may include a link to any type of data object, including geographic data objects (e.g., the geographic data object 201) and slide data objects (e.g., the slide data object 301). In some implementations, a slide data link 305 may link to other slide data objects (e.g., slide data object 308) as part of a linear multi-slide presentation. In some implementations, the slide data link 305 may link to other slide data objects as part of a tiered or hierarchical presentation. For example, information presented in a given slide that corresponds to a slide data object 301 may link to an additional slide (or slides) that provide additional detail. Thus, in this example, a viewer of the given slide may choose to view the next linked presentation slide in sequence. Alternatively, the viewer may choose to view additional linked presentation slides that provide more detail on a topic presented by the given slide. In various implementations, the slide data links 305 may share the properties of other data links as described above. Thus, in some implementations, the slide data structure 300 defines a data ontology for a slide data object 301, which may be a data object that includes map data and other information to be presented with the map data.

Figure 4:
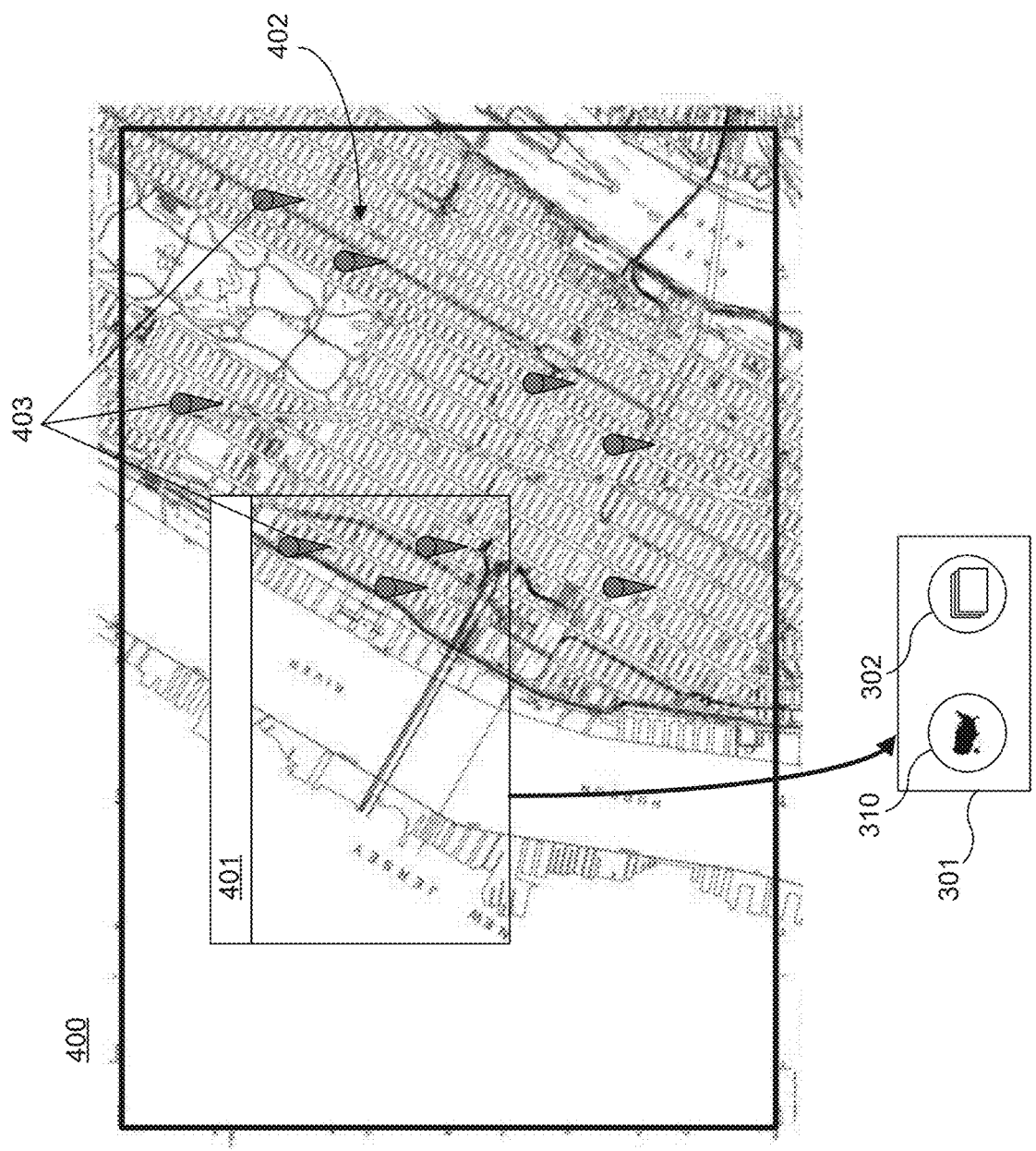
FIG. 4 illustrates an example diagram of a map interface provided for generating map-based slides, according to some implementations.

FIG. 4 illustrates an example map interface 400 that allows users to generate slide data objects (e.g., the slide data object 301) from geographical map data. For example, the map interface 400 may be accessed through a software application that is running on a computing device. In this example, the map interface 400 can be presented through a display screen of the computing device. In various implementations, the map interface 400 can present map data (e.g., the map data 402). In general, the map data can provide a visual representation of a desired geographic region and at various levels of detail. In some implementations, the map interface 400 can provide a search option through which users can search for desired geographic regions. In the example of FIG. 4, the map interface 400 is presenting map data 402 that provides a visual representation of a geographic region. In some implementations, the map interface 400 can provide a set of software tools that allow users to navigate and customize the display of the map data 402. For example, such software tools can perform operations such as panning the map data 402, modifying a zoom level of the map data 402, accessing different mapping layers, altering naming conventions, selecting and deselecting features included in the map data 402, among others. A user interacting with the map interface 400 can select a capture tool to define a selection area 401 in the map data 402. For example, the selection area 401 can be selected by performing operations (or gestures) for drawing a slide framing window over the map data 402 through the map interface 400.

After the user has defined the selection area 401, the user may select an option to export the selection area 401. In some implementations, a slide is generated from the exported selection area 401. This slide can then be included in a slide presentation. In some implementations, data corresponding to the exported selection area 401 is stored as a slide data object (e.g., the slide data object 301). Exported slide data object 301 may include slide map data 310 including information describing the selection area 401. For example, the information can be using map data extracted from the map data 402 and/or as a series of parameters defining the selection area (e.g., such as coordinates, map customization settings, etc.). In some implementations, the system may export, with the slide data object 301, any geographic data objects located within the selection area 401. In some implementations, geographic data objects (e.g., geographic data objects 403) can be identified in the map data 402 as points of interest. In some implementations, a user may select geographic data objects located within the selection area 401 to be included in a slide data object being exported. In some implementations, the geographic data object icons 403 may be representative of other slide data objects. Thus, for example, a user may build a hierarchical slide presentation by determining a selection area that includes other slide data objects. In this example, any slide data objects that are included in an area selected in the map data 402 can be included in the newly created slide.

After extracting a slide data object (e.g., the slide data object 301), the system may facilitate the customization of a slide associated with the slide data object 301. Accordingly, the user may add or link to additional information to be included in the displayed slide. Such information may be included in one or more slide data properties 302 of the slide data object 301, for example. The user may further determine to link the slide data object 301 to other slide data objects using slide data links (e.g., slide data links 305). By linking one slide data object to another, the user can create a series of linked slides for display in a slide presentation. In one example, a first slide data object corresponding to a given slide may be linked to a second slide data object that corresponds to various data (e.g., map data). The second slide data object may provide information that is referenced during presentation of the given slide and/or information that supports statements made in the given slide.

The system may further determine access control levels to regulate the amount of data that is shown during a slide presentation. In some implementations, access control levels can be assigned by a user that creates a slide data object and/or may be assigned by an alternative system operator to any data aspect stored by the system. For example, in some implementations, when a new slide data object 301 is created, the slide map data 310, the various slide data properties 302, and any linked data objects (as defined by the slide data links 305) may each be assigned a corresponding access control level by a user creating the slide data object 301. In some implementations, data may already have an access control associated. For example, a selection area 401 may incorporate one or more geographic data objects 201, which may already include an assigned access control level. When incorporated into a slide data object 301, either directly as a slide data property 302 or via linking, the previously assigned access control level of the included geographic data object may remain intact. In some implementations, when creating a slide or slide presentation based on a slide data object 301, the system may embed information corresponding to the assigned access control level into the slide or slide presentation.

In various implementations, a slide presentation (or a slide deck) can be created using the approaches described above. This slide presentation can then be shown to an audience. In some implementations, an individual (e.g., a presenter) can interact with map data included in the slide presentation while slides are being presented to the audience. That is, in some implementations, the presenter may dynamically interact with map data being presented without losing their position in the slide presentation. For example, in some implementations, the presenter may choose to respond to questions from an audience member by manipulating map data, including panning and zooming, interacting with other map data objects, or by navigating to another slide based on the geospatial reference of that slide rather than its location in the presentation. In such implementations, this manipulation of map data allows the presenter to appropriately respond to questions and/or to communicate various information during the presentation without affecting the overall slide presentation sequence.

Figure 5:
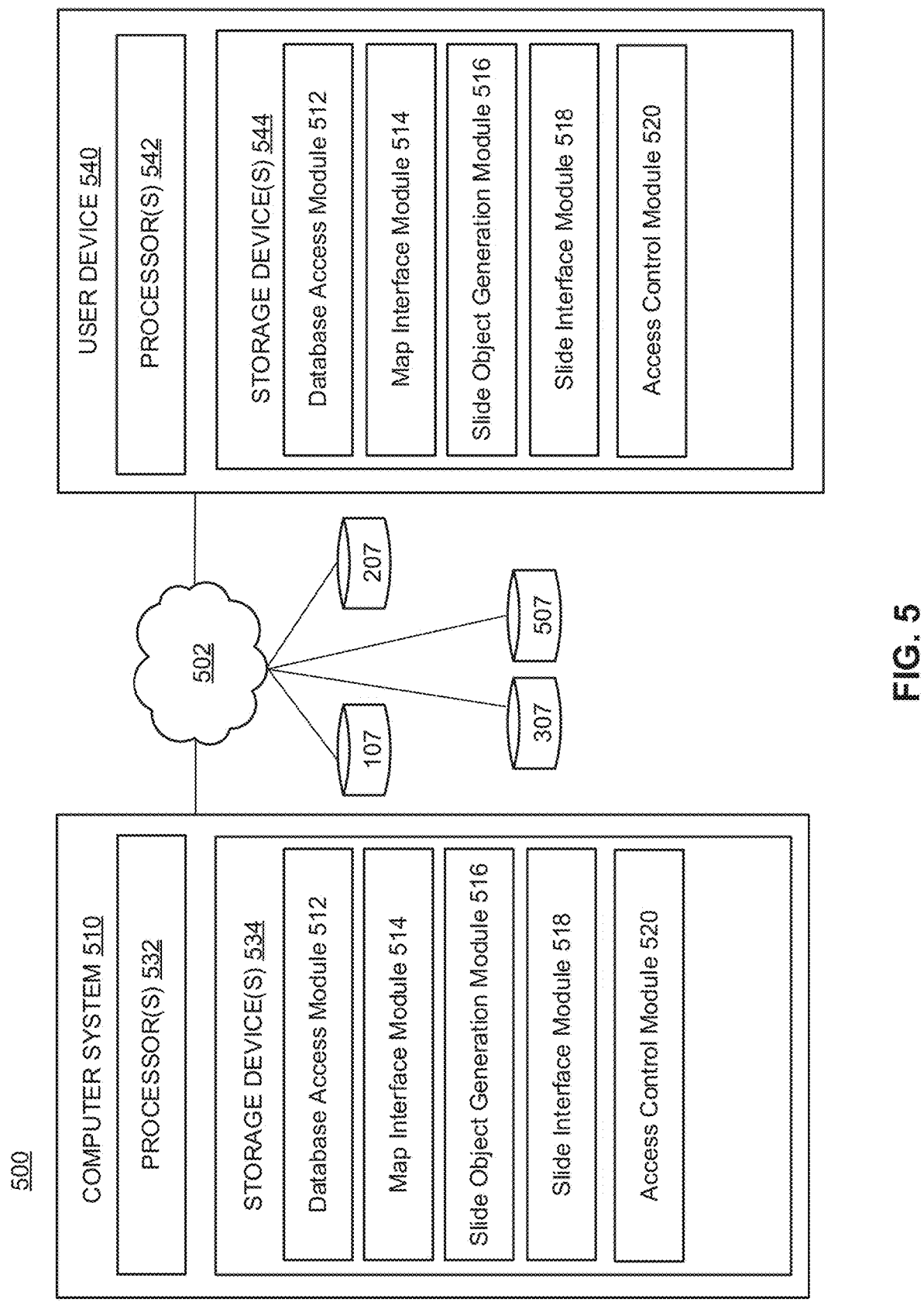
FIG. 5 illustrates an example environment for generating dynamically linked slide presentations, according to some implementations.

FIG. 5 depicts an example environment 500 for facilitating generation of dynamically linked slides from geographic map data. In one implementation, the environment 500 may include one or more of a computer system 510, a user device 540, an object data source 107, a geographic data source 207, a slide data source 307, and a map data source 507, in communication via network 502, and/or other components. The data sources 107, 207, 307, 507 are illustrated in FIG. 5 as being separate from the computer system 510 and the user device 540. In some implementations, the data sources 107, 207, 307, 507 may be stored on computer system 510, user device 540, and/or at a remote location. In some implementations, the data sources 107, 207, 307, 507 may be stored in the same location and/or may be stored in the same database. As illustrated in FIG. 5, each of the software modules may be in operation on user device 540 and/or on computer system 510. Various aspects of the slide generation system may operate on computer system 510 and/or on user device 540. That is, the various software modules described herein may each operate on one or both of computer system 510 and/or user device 540.

The data sources 107, 207, 307, 507 may be computer memories configured to store data. Further, the data sources 107, 207, 307, 507 may store data formatted according to object based data structures as described above. For example, the data source 107, geographic data source 207, and slide data source 307 are described above. In some implementations, the map data source 507 may store map data of a geographic region. The stored map data may include multi-layer maps, e.g., streets, topography, underground, buildings, etc. The stored map data may also include information about geographic locations on the map. The stored map data may further include any additional relevant map data. In some implementations, the stored map data may include references to data objects, such as geographic data objects (e.g., geographic data object 201) and/or slide data objects (e.g., slide data object 301) associated with various locations in the map.

The computer system 510 may be configured as a server (e.g., having one or more server blades, processors, etc.), a personal computer (e.g., a desktop computer, a laptop computer, etc.), a smartphone, a tablet computing device, and/or other computing device that can be programmed to receive tabular data or object based data, provide services for the manipulation of the data, and provide services for transformation and display of the data.

Figure 7:
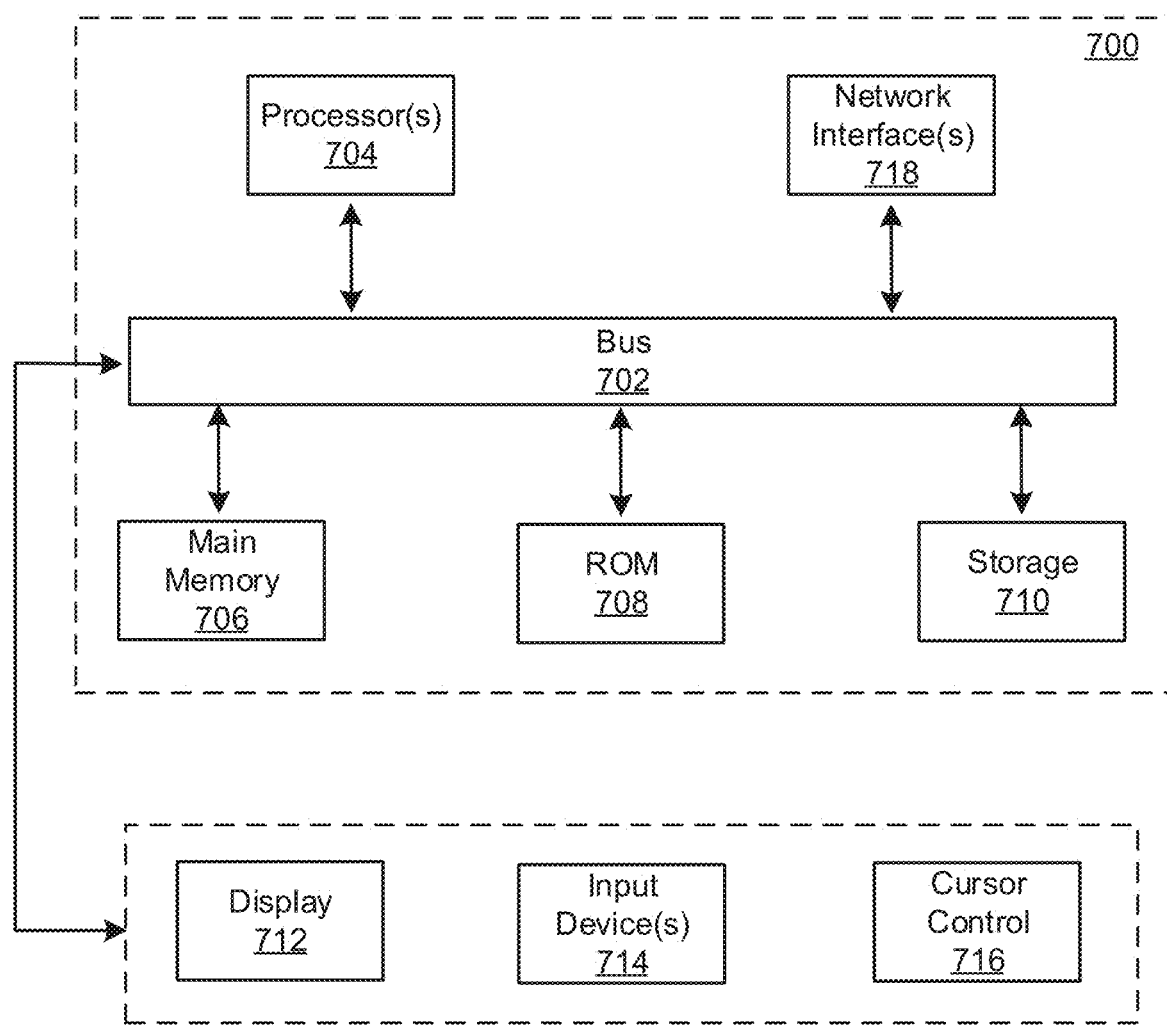
FIG. 7 illustrates a block diagram of an example computer system in which any of the implementations described herein may be implemented.

The computer system 510 may include one or more processors 532 (also interchangeably referred to herein as processors 532, processor(s) 532, or processor 532 for convenience), one or more storage devices 534, and/or other components. Processors 532 may be programmed by one or more computer program instructions stored on storage device 534. For example, processors 532 may be programmed by database access module 512, map interface module 514, slide object generation module 516, slide interface module 518, access control module 520, and/or other instructions that program computer system 510 to perform various operations, each of which are described in greater detail herein. As used herein, for convenience, the various instruction modules, systems, and engines will be described as performing an operation, when, in fact, the various instructions program the processors 532 (and therefore computer system 510) to perform the operation. Further details and features of a computer system 510 configured for implementing features of the described technology may be understood with respect to computer system 700 as illustrated in FIG. 7.

User device 540 may be configured as a server (e.g., having one or more server blades, processors, etc.), a personal computer (e.g., a desktop computer, a laptop computer, etc.), a smartphone, a tablet computing device, and/or other device that can be programmed to receive tabular data or object based data, provide services for the manipulation of the data, and provide services for transformation and display of the data.

User device 540 may include one or more processors 542 (also interchangeably referred to herein as processors 542, processor(s) 542, or processor 542 for convenience), one or more storage devices 544, and/or other components. Processors 542 may be programmed by one or more computer program instructions. For example, processors 542 may be programmed by database access module 512, map interface module 514, slide object generation module 516, slide interface module 518, access control module 520, and/or other instructions that program user device 540 to perform various operations, each of which are described in greater detail herein. As used herein, for convenience, the various instruction modules will be described as performing an operation, when, in fact, the various instructions program the processors 542 (and therefore user device 540) to perform the operation.

In various implementations, the database access module 512, may be a software module operating on computer system 510 and/or user device 540. Database access module 512 may be configured to provide system access to data sources, e.g., the data sources 107, 207, 307, 507. Database access module 512 may be configured to read and write to data sources 107, 207, 307, 507, as well as carry out searches, queries, and any other database functionality required by computer system 510 and/or user device 540. In some implementations, the database access module 512 may access data objects (e.g., data objects 101), geographic data objects (e.g., geographic data objects 201), slide data objects (e.g., slide data objects 301), and stored map data.

In various implementations, the map interface module 514, may be a software module operating on computer system 510 and/or user device 540. Map interface module 514 may provide a map interface to a user via a computer display and receive user inputs for manipulation of the map display. Map interface module 514 may provide the user with the tools and features to determine a selection area (e.g., the selection area 401) from map data of a geographic region and generate a slide data object (e.g., the slide data object 301). Map interface module 514 may communicate with database access module 512 to obtain map data from map data sources (e.g., the map data source 507) for geographic regions to be presented to a user. Map interface module 514 may further communicate with database access module 512 to obtain data from data source 107, geographic data source 207, and slide data source 307, for example.

Map interface module 514 may customize a map according to user interactions. For example, the map interface module 514 may adjust the various aspects included on the map, including panning and zooming, layers, geographic data objects, slide data objects, geographic features, map feature names, etc., according to a user's inputs and/or interactions with the map interface. Map interface module 514 can capture a portion of the geographic region based on the user's selection of a selection area (e.g., the selection area 401).

In some implementations, the map interface module 514 may further provide a user with data entry options to add additional information to a slide for presentation. Additional data entry options may permit a user to include text, images, videos, etc., within a slide. Map interface module 514 may further receive inputs from a user to link a slide to one or more other slides in the same presentation or in different presentations.

In various implementations, the slide object generation module 516, may be a software module operating on computer 510 and/or user device 540. Slide object generation module 516 may receive data including a selected map portion and included geographic data objects (e.g., the geographic data objects 201) and slide data objects (e.g., slide data objects 301) as well as any additional data entered by the user for slide object generation from map interface module 514. Slide object generation module 514 may create a slide data object (e.g., slide data object 301) storing the selected portion of the geographic region as slide map data (e.g., slide map data 310), and storing geographic data objects (e.g., geographic data objects 201), slide data objects (e.g., slide data objects 301), and any additional information provided by a user as slide object properties (e.g., slide object properties 302). In some implementations, slide data objects and geographic data objects may be linked to via slide data object links. Slide data object links may further store links to additional slides in a presentation, as selected or designated by a user via map interface module 514.

In some implementations, the slide object generation module 516 may generate one or more slides of a slide presentation for viewing independent of access to data sources 107, 207, 307, 507. That is, in such implementations, all of the data required for display of a slide presentation, including all linked slides and data objects, may be packaged together in one or more files for export for display on a system that cannot access the data sources.

In various implementations, the slide interface module 518, may be a software module operating on computer system 510 and/or user device 540. Slide interface module 518 may be configured to access a slide data object (e.g., slide data object 301), e.g., via database access module 512, and generate a slide of a slide presentation for display to a user. Slide interface module 518 may access and display map data stored in or linked to via slide map data (e.g., slide map data 310) and may display additional slide information stored as slide object properties (e.g., slide object properties 302) and/or linked to the slide data object via slide object data links (e.g., slide object data links 305).

In various implementations, the slide interface module 518 may access a slide data object (e.g., slide data object 301) to display a slide as part of a larger slide presentation, and may provide to a user software tools to navigate a slide presentation, both linearly and hierarchically. Slide interface module 518 may advance a slide presentation linearly from one slide to the next, accessing the respective slide data objects associated with each slide in the presentation. Slide interface module 518 may further access and cause the display of geographic data objects (e.g., geographic data objects 201) and slide data objects linked to via slide data object links. For example, when viewing a slide of a presentation, a user may choose to navigate to the next slide in a linear display and/or may select a geographic data object or slide data object included in the selected map area. Navigating to a geographic data object or slide data object included in the selected map area may permit the user to access data sources from which the slide is created and/or to access additional slide presentations that provide greater detail to topics discussed in the initial slide. In some implementations, additional slides (or slide presentations) may be pre-built in anticipation of certain topics and/or questions that may arise during a given slide presentation. That is, these additional slides may include information (e.g., map data) that specifically addresses various topics and/or questions that may or may not be needed during the slide presentation. In such implementations, these additional slides are typically not shown during the slide presentation unless needed. If needed during the presentation, the presenter can access the additional slides either by locating these slides geospatially and/or by accessing a direct link to the slides from a slide (or parent slide) in the presentation.

In some implementations, the slide interface module 518 may update a slide presentation for display. A user may access and display a slide presentation associated with one or more slide data objects at a first time. After accessing the slide presentation, data associated with the various data (e.g., geographic data objects 201 and slide data objects 301, as well as map data 402) associated with the slide display may be updated. In such instances, the user may access and display the slide presentation after data has been updated. When the slide presentation is accessed again, slide interface module 518 may provide an updated slide presentation for display and interaction with the user. In some implementations, the user selects an update option to cause the slide presentation to be updated based on changes to the underlying data (e.g., geographic data objects 201 and slide data objects 301, as well as map data 402).

In various implementations, the access control module 520 may be a software module operating on computer system 510 and/or user device 540. Access control module 520 may operate to verify viewer access levels and adjust slide presentation access according an access level of one or more viewers. Access control module 520 may operate in concert with slide interface module 518 to cause the display of slide elements corresponding to an access level of viewers of the slide presentation. Access control module may also operate in concert with slide object generation module 516 to receive access control levels associated with the data of slide data objects and embed information corresponding to the access control levels with that data in the corresponding slide data objects. As discussed above, any and all data associated with a slide data object, including slide map data, slide data properties, and any data linked to the slide data object via a slide data link may be designated with a corresponding access level control designating a required access level for viewing.

In some implementations, when a slide presentation is being presented, a presenter can identify the respective access levels of entities in the audience using the access control module 520. For example, in some implementations, access levels may be represented as security categories (or "hats"). When giving a slide presentation, the presenter can indicate the respective security categories (or hats) corresponding to individuals in the audience. Based on the indicated access levels, the access control module 520 can automatically modify the slide presentation so that only slides (or information in slides) that are cleared for access by the audience are displayed. In some implementations, the access control module 520 may require potential viewers to log-in via user name and password, may require biometric scanning, may require physical credential verification, and/or may require any other suitable verification.

In some implementations, the access control module 520 may cause the selective display of data associated with a slide data object according to the access levels of viewers. For example, where all viewers have access to all data, the access control module 520 may permit slide interface module 518 to display all aspects of a slide presentation. In another example, if a verified user has an access level that does not permit viewing of all data, any data not permitted by that user's access level is not displayed. In another example, users may have access to information provided in a slide presentation, but may lack access to any linked geographic data objects or slide data objects that support the information on the slide. In this example, a user may be permitted to see summarized information without being permitted to see the more in-depth information from which the summary information is created. In some implementations, the slides, or portions of the slides, are redacted based on audience access levels. In some implementations, when multiple entities in the audience have different access levels, the union of these access levels is used to determine which aspects of the slide presentation will be shown.

Although illustrated in FIG. 5 as a single component, computer system 510 and user device 540 may each include a plurality of individual components (e.g., computer devices) each programmed with at least some of the functions described herein. In this manner, some components of computer system 510 and/or user device 540 may perform some functions while other components may perform other functions, as would be appreciated. The one or more processors 532, 542 may each include one or more physical processors that are programmed by computer program instructions. The various instructions described herein are exemplary only. Other configurations and numbers of instructions may be used, so long as the processor(s) 532, 542 are programmed to perform the functions described herein.

Furthermore, it should be appreciated that although the various instructions are illustrated in FIG. 5 as being co-located within a single processing unit, in implementations in which processor(s) 532, 542 includes multiple processing units, one or more instructions may be executed remotely from the other instructions.

Additionally, the modular software breakdown as illustrated in FIG. 5 is prepared for illustrative purposes only. The various instructions described with respect to specific software modules may be implemented by alternative software modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 532, 542 may be programmed by one or more additional instructions that may perform some or all of the functionality attributed herein to one of the instructions.

The various instructions described herein may be stored in a storage device 534, 544 which may comprise random access memory (RAM), read only memory (ROM), and/or other memory. The storage device may store the computer program instructions (e.g., the aforementioned instructions) to be executed by processor 532, 542 as well as data that may be manipulated by processor 532, 542. The storage device may comprise floppy disks, hard disks, optical disks, tapes, or other storage media for storing computer-executable instructions and/or data.

The various components illustrated in FIG. 5 may be coupled to at least one other component via a network 502, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 5, as well as in other drawing Figures, different numbers of entities than those depicted may be used. Furthermore, according to various implementations, the components described herein may be implemented in hardware and/or software that configure hardware.

Figure 6:
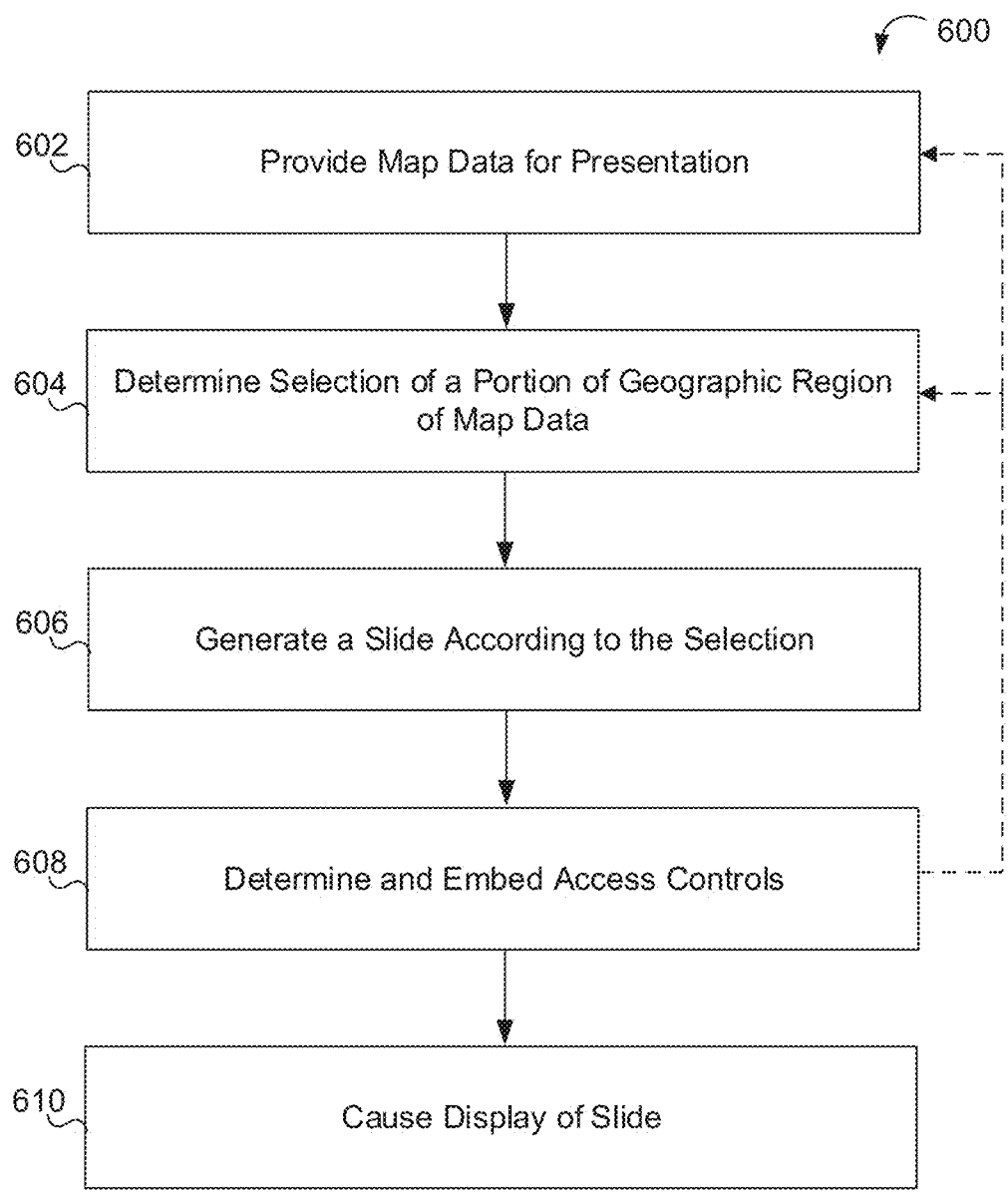
FIG. 6 illustrates an example process flow chart of a method, according to some implementations.

FIG. 6 depicts a process flow chart of a method 600 for facilitating the user implementation of data transformations. The various processing operations and/or data flows depicted in FIG. 6 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, map data may be provided to a user via a map interface (e.g., the map interface 400). For example, the map interface module 514 may operate to obtain map data (e.g., map data 402) via database access module 512 and present a map interface to a user. The map data provided may correspond to a specific geographic region. Map interface module 514 may further provide the user software tools for map manipulation, as described above.

In an operation 604, a selection of a portion of the geographic region may be determined via the map interface. The selection may be determined according to user input through the map interface. The selected portion of the geographic region may include all of the map data encompassed by the selected portion, as well as any data objects, geographic data objects, and slide data objects associated with and/or located within the selected portion of the geographic region.

In an operation 606, a slide of a slide presentation may be generated according to at least the selected portion. The generated slide may include a visual representation of the selected portion as well as visual representations of any data objects encompassed therein. For example, the slide object generation module 516 may extract data for a slide data object from the map data and data objects of the selected portion in the map interface.

In some implementations, operation 606 may further include receiving additional information, from the user via map interface, for inclusion within the slide. For example, where a user has selected a specific map portion, the user may then wish to add bullet points and or other data to complete the slide. Additional user information, including added data as well as linked-to data objects may be included in the slide data object representative of the newly created slide.

In an operation 608, access controls may be determined and embedded within the slide data object and/or within the newly created slide. Access controls may be determined and embedded by operation of access control module 520. Access controls may be determined by direct user input. For example, a user may individually assign required access levels to various pieces of data and information in a newly created slide. Access controls may also be determined by incorporation. For example, when the selected portion includes a geographic data object that becomes incorporated in the newly created slide, the access level of that geographic data object may remain the same in the newly created slide. In some implementations, the user may be given an opportunity to adjust the access level of incorporated data.

In some implementations, the system may return to operation 602 or operation 604 to permit a user to generate one or more additional slides to create a slide presentation.

In an operation 610, one or more slides of a presentation may be displayed. Slide interface module 518 may operate to cause display of the newly created slide or slides on a computer display. The slide or slides may be cause to be displayed on a computer system 510, user device 540, and/or any other computer system including a display capable of displaying the slide to any viewer or viewers. Slide interface module 518 may cooperate with access control module 520 to determine which portions of the slide(s) to display, based on access control levels of viewers as determined by access control module 520.

Thus, slide generation process 600 may provide a method of generating slides by extracting slide data objects from map data according to user input and manipulation of the map data. The extracted slide data objects may be the data source for the newly generated slides, and a user may generate as many slide data objects as needed to complete a slide presentation. Created slides may encompass any or all map data and/or data objects within a selected map portion, according to user input. A user may apply access level controls to the newly created slides, and/or may apply previously assigned access level controls to incorporated data. The system may further cause the display of the newly created slides and access control of their content.

FIG. 7 depicts a block diagram of an example computer system 700 in which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for generating a dynamically linked geographical slide presentation, the system comprising:
one or more processors and memory storing instructions that, when executed by the one or more processors, cause the system to:
provide map data corresponding to a given geographic region for presentation through an interface, the map data being linked to one or more geographical data objects defined according to a first ontology, the one or more geographical data objects corresponding to one or more locations of the geographic region;
determine a selection of a portion of the geographic region through the interface, the selected portion of the geographic region associated with a first geographical data object of the one or more geographical data objects;
generate a first slide data object, the first slide data object defined according to a second ontology, the first slide data object including a first link to the first geographical data object and a second link to a second slide data object, the second slide data object including information describing a map feature of the selected portion of the geographic region associated with the first geographical data object;
generate a non-linear hierarchical slide presentation including a plurality of slides, the non-linear hierarchical slide presentation being generated based on the first slide data object and the second slide data object; and
present a first slide of the non-linear hierarchical slide presentation, the first slide including at least a visual representation of the selected portion of the geographic region based on the first link between the first slide data object and the first geographical data object, and the first slide including the information of the second slide data object based on the second link between the first slide data object and the second slide data object.

2. The system of claim 1, wherein the system is further caused to: obtain access levels of potential viewers of the first slide; determine a display status of data of the first slide according to the one or more access control levels; and cause display of the first slide of the slide presentation on a computer display device according to the display status.

3. The system of claim 2, wherein determining a display status further causes the system to:
determine to display first data of the first slide for which the minimum access level among the potential viewers satisfies the access level of the first data; and
determine not to display second data of the first slide for which the minimum access level among the potential viewers does not satisfy the access level of the second data.

4. The system of claim 1, wherein map data corresponding to the selected portion of the geographic region is linked to the first geographical data object of an object graph, and wherein modifications to the first geographical data object cause the visual representation of the selected portion of the geographic region in the first slide to be updated.

5. The system of claim 1, wherein to determine the selection of a portion of the geographic region through the interface further causes the system to determine map features to include within the selected portion.

6. The system of claim 1, wherein the system is further caused to: generate a third slide data object according to a second selection of a second portion of the geographic region, wherein the third slide data object references a portion of the map data corresponding to the second selection.

7. A method for generating a dynamically linked geographical slide presentation, the method being performed on a computer system having one or more physical processors programmed with computer program instructions that, when executed by the one or more physical processors, cause the computer system to perform the method, the method comprising: providing, by the computer system, map data corresponding to a given geographic region for presentation through an interface, the map data being linked to one or more geographical data objects defined according to a first ontology, the one or more geographical data objects corresponding to one or more locations of the geographic region; determining, by the computer system, a selection of a portion of the geographic region through the interface, the selected portion of the geographic region associated with a first geographical data object of the one or more geographical data objects; generating, by the computer system, a first slide data object, the first slide data object defined according to a second ontology, the first slide data object including a first link to the first geographical data object and a second link to a second slide data object, the second slide data object including information describing a map feature of the selected portion of the geographic region associated with the first geographical data object; generating a non-linear hierarchical slide presentation including a plurality of slides, the non-linear hierarchical slide presentation being generated based on the first slide data object and the second slide data object; and presenting a first slide of the non-linear hierarchical slide presentation, the first slide including at least a visual representation of the selected portion of the geographic region based on the first link between the first slide data object and the first geographical data object, and the first slide including the information of the second slide data object based on the second link between the first slide data object and the second slide data object.

8. The method of claim 7, further comprising: obtaining, by the computer system, access levels of potential viewers of the first slide; determining, by the computer system, a display status of data of the first slide according to the one or more access control levels; and causing, by the computer system, display of the first slide of the slide presentation on a computer display device according to the display status.

9. The method of claim 8, wherein determining the display status further comprises:
determining, by the computer system, to display first data of the first slide for which the minimum access level among the potential viewers satisfies the access level of the first data; and
determining, by the computer system, not to display second data of the first slide for which the minimum access level among the potential viewers does not satisfy the access level of the second data.

10. The method of claim 7, wherein map data corresponding to the selected portion of the geographic region is linked to the first geographical data object of an object graph, and wherein modifications to the first geographical data object cause the visual representation of the selected portion of the geographic region in the first slide to be updated.

11. The method of claim 7, wherein determining the selection of a portion of the geographic region through the interface further comprises:
determining, by the computer system, map features to include within the selected portion.

12. The method of claim 7, further comprising: generating, by the computer system, a third slide data object according to a second selection of a second portion of the geographic region, wherein the third slide data object references a portion of the map data corresponding to the second selection.

* * * * *